Aug. 30, 1932.  E. H. FAHRNEY  1,874,263
TEMPERATURE AND FLOW INDICATOR AND FLOW
CONTROL OF COOLING WATER FOR MOTORS
Filed Nov. 15, 1929  2 Sheets-Sheet 1
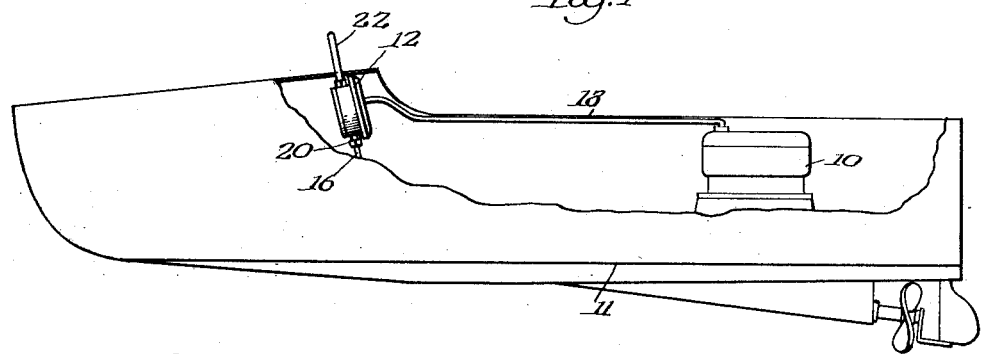
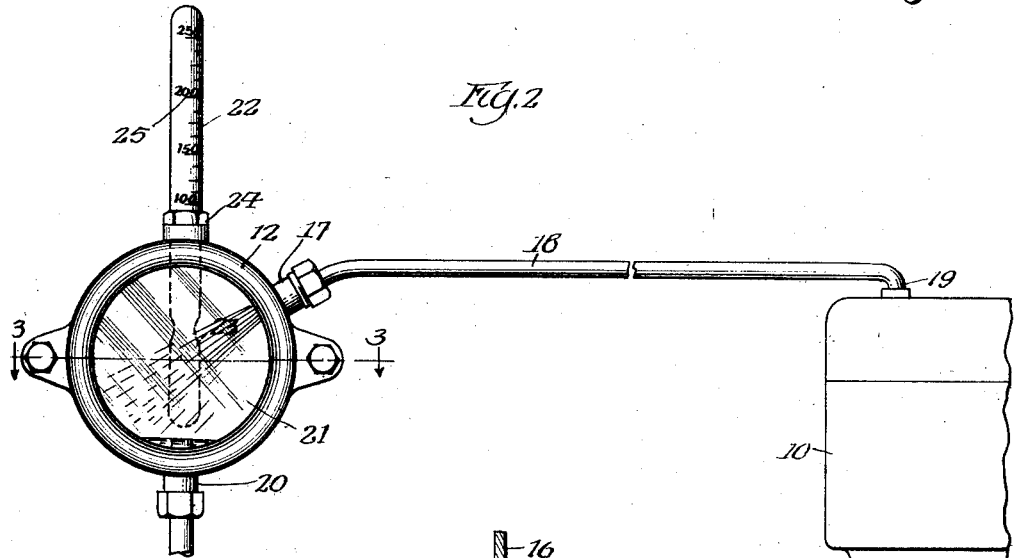
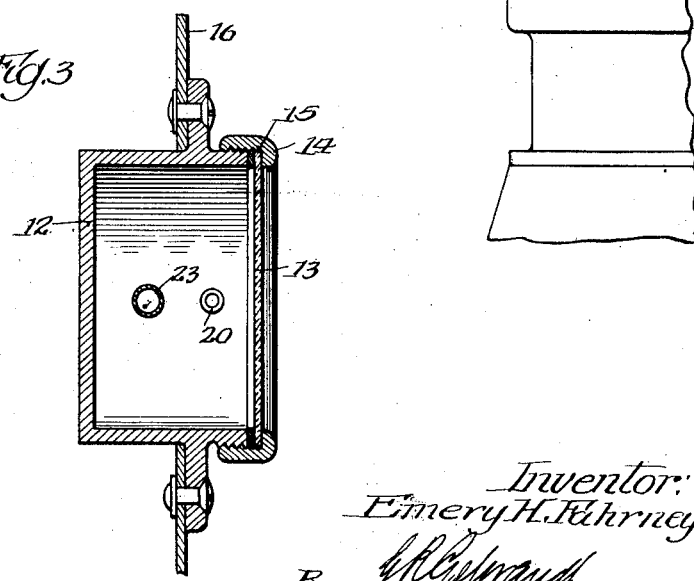
Inventor:
Emery H. Fahrney
By _____ Atty.

Aug. 30, 1932.  E. H. FAHRNEY  1,874,263
TEMPERATURE AND FLOW INDICATOR AND FLOW
CONTROL OF COOLING WATER FOR MOTORS
Filed Nov. 15, 1929   2 Sheets-Sheet 2
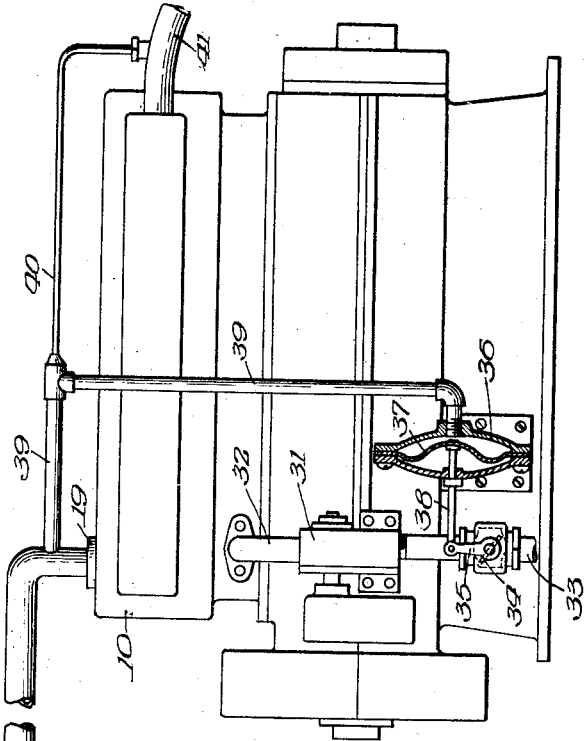
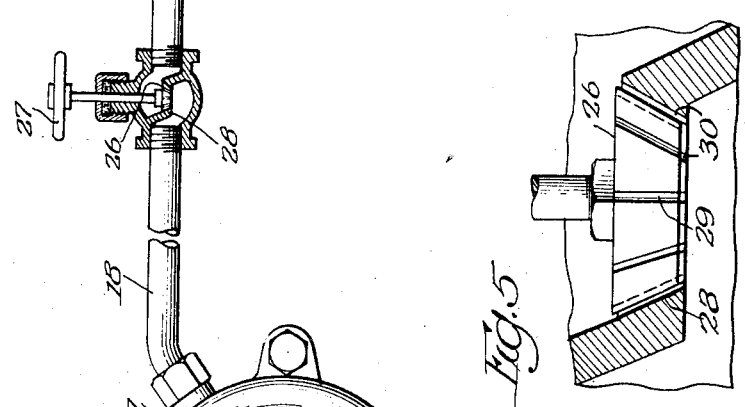
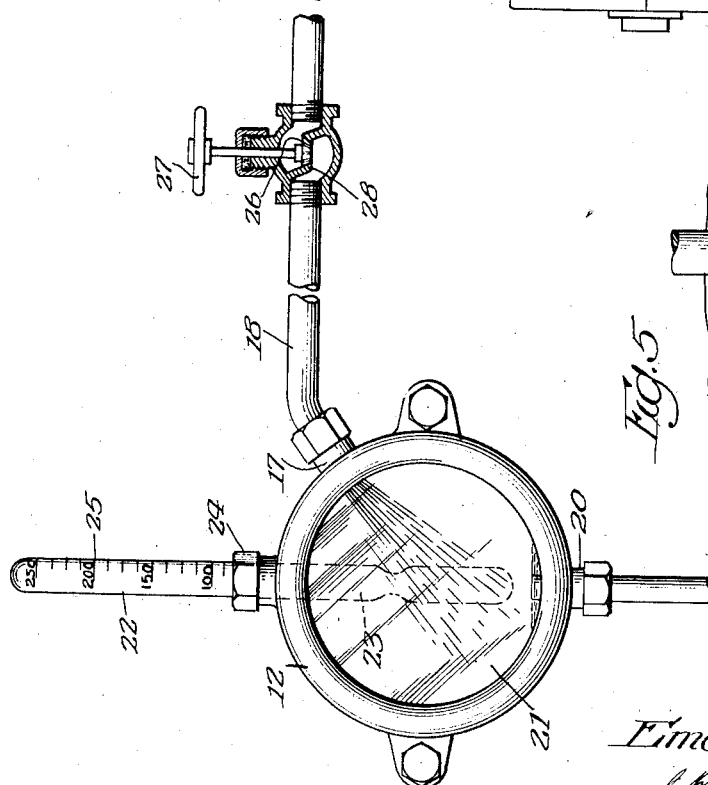
Inventor
Emery H. Fahrney Patented Aug. 30, 1932

1,874,263

UNITED STATES PATENT OFFICE

EMERY H. FAHRNEY, OF CHICAGO, ILLINOIS

TEMPERATURE AND FLOW INDICATOR AND FLOW CONTROL OF COOLING WATER FOR MOTORS

Application filed November 15, 1929. Serial No. 407,448.

This invention relates to improvements in water and temperature indicators particularly adapted, though not necessarily limited in its use, with engines for motor boats, and for controlling the flow of the cooling water for the engine, and one of the objects of the same is to provide improved means for visually indicating whether or not the cooling water for the engine is circulated properly, thereby also indicating whether or not the water pump is in operation.

A further object is to provide an improved indicator of this character having combined therewith means for indicating the temperature of the water in the cooling system.

A further object is to provide a combined indicator and gage of this character adapted to be placed upon the instrument board or at any other point convenient for the operator and remote from the engine.

It has been found in practice that the temperature of the cooling water is too low in comparison to the temperature of the combustion, resulting in a decrease of the termal efficiency of the engine, therefore requiring a larger amount of fuel for a predetermined horse power. Therefore, in order to keep the cooling water at a predetermined temperature which influences the heat conditions to an extent that the maximum power or efficiency can be obtained with a minimum amount of fuel, is another object of the present invention.

A further object is to provide improved means for controlling the amount of circulating water through the medium of a valve to create a pressure in the circulating system and which pressure operates upon mechanism which in turn controls the inlet of the water to the cooling system.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a view in side elevation, partly broken away and with parts omitted, showing a construction of boat, having an indicator of this character constructed in accordance with the principles of this invention applied thereto.

Figure 2 is an enlarged detail view, partly broken away and with parts omitted, showing the connection of the indicator with the engine cooling system.

Figure 3 is an enlarged detail sectional view taken on line 3—3, Figure 2.

Figure 4 is a view partly in elevation and partly in section of another form of the invention.

Figure 5 is an enlarged sectional view in detail of the controlling valve.

Referring more particularly to the drawings the numeral 10 designates generally a motor mounted within a boat 11. The numeral 12 designates a receptacle which may be of any desired size and configuration and is provided with a transparent closure 13 for an open side thereof, the closure being preferably secured in position by means of a suitable annular member or cap 14, suitable packing 15 being provided to form a fluid tight joint.

The receptacle thus formed may be supported upon any suitable support, such as the instrument board 16 of the boat, and is provided with an inlet opening 17 which is connected by means of a pipe 18 with the engine 10 as at 19, and has connection with the cooling water circulating system.

When the pumps operate to circulate the cooling water in the cooling system, a portion of the water will be discharged through the pipe 18 into the receptacle 12 and by reason of the transparent closure 13 there will be a visual indication of the water circulation by reason of the water being discharged into this receptacle.

Leading from the receptacle 12 at any convenient point is a discharge outlet 20 for conveying away the water 21 which has been discharged thereinto.

Supported by the receptacle 12 is a thermometer 22, a portion 23 of which projects into the receptacle 12 and also extends thereabove, the thermometer being held in position in any suitable manner such as by means of a fastening collar 24.

The thermometer is provided with the usual graduations 25 to indicate temperature.

With this improved construction it will be manifest that the indicator may be disposed at a point remote from the engine and when the water circulating system and pumps are operating, a portion of the water will be discharged into the receptacle 12 to be viewed by the operator. At the same time the temperature of the water will be indicated through the medium of the thermometer 22, thereby giving visual indications of the circulation of the cooling water and of the temperature of the water.

As shown in Figure 4 of the drawings, means are provided whereby the temperature of the cooling water may be controlled or varied to suit the conditions and to that end there is provided in the pipe 18 which leads from the circulating system to the indicator 12 a valve designated generally by the reference numeral 26.

This valve is adapted to be actuated by means of an operating handle 27 and co-operates with a seat 28. The valve should be so constructed that it will not completely close the pipe 18 to the passage of the liquid therethrough but by adjusting the valve the size of the passage may be controlled to control the amount of circulating water which is discharged through the pipe 18.

To that end the valve may be provided with grooves or openings 29 in the active face thereof which co-operate with grooves 30 arranged in the valve seat, the valve is preferably conical and the seat is shaped to conform thereto.

It will therefore be manifest that when the valve is fully seated there will still be passages to permit the liquid to flow through and be discharged from the pipe 18.

Circulation of the cooling liquid is effected by means of a pump 31 which may be of any desired or the usual construction which forces the liquid through the pipe 32 into the engine casing.

An inlet pipe 33 is provided for supplying water to the pump 31 and this pipe 33 receives its supply from any suitable source.

Within the pipe 33 is a valve 34 preferably of the butterfly type, although any other form of valve may be employed and the valve is adapted to be actuated by means of an arm 35 connected thereto.

A fluid pressure control device 36 preferably in the form of a casing having a flexible diaphragm 37 therein, is provided for operating the valve 34, and to that end the arm 35 is connected by means of a rod 38 with the diaphragm 37.

Leading from the pipe 18 is a branch pipe 39 which has communication with the diaphragm chamber 36 on one side of the diaphragm.

Leading from the pipe 39 is an overflow pipe 40, which may discharge at any suitable point, but preferably into the exhaust pipe 41.

When the pump 31 is operating and the valve 34 is open and the valve 26 is opened to the fullest extent, the water drawn in by the pump 31 will be forced through the water circulating system and will be discharged through the pipe 18, past the valve 26 into the receptacle 12.

When, however, it is desired to reduce the flow of the cooling liquid in order to increase the temperature thereof, the valve 26 may be closed or partly closed to meet the required conditions, and in that event the passage past the valve 26 will not be sufficient to permit the whole amount of the liquid to flow through the pipe 18. There will then be built up a pressure in the pipe 18 and this pressure will be manifested upon the diaphragm 37 through the pipe 39, causing the diaphragm to be moved in a direction to correspondingly adjust or partially close the valve 34, thereby shutting off the supply of liquid through the pipe 18. In order to take care of the excess amount of liquid under these conditions the overflow pipe 40 is provided.

While the preferred forms of the invention have been herein shown and described, it is to be understood that various changes may be made in the details of construction and in the combination and arrangement of the several parts, within the scope of the claims, without departing from the spirit of this invention.

What is claimed as new is:—

1. In combination an engine having a water circulation cooling system, an inlet for the system, a circulation indicator included in said system, a valve for controlling said inlet, means for controlling the circulation of the water in said system, and means responsive to the operation of the last said means for controlling the said inlet.

2. In combination an engine having a water circulation cooling system, an inlet for the system, a circulation indicator included in said system, a valve for controlling said inlet, means for controlling the circulation of the water in said system, and fluid pressure controlled means responsive to the operation of the last said means for controlling the said inlet.

3. In combination an engine having a water circulation cooling system, an inlet for the system, a circulation indicator included in said system, a valve for controlling said inlet, means for controlling the circulation of the water in said system, means responsive to the operation of the last said means for controlling the said inlet, and an overflow leading from the said system.

4. In combination an engine, a water gage located at a point remote from the engine, a connection between the said engine and gage whereby water from the circulating system will be visibly discharged into the gage during the operation of the cooling system, an inlet for the cooling system, means for controlling the discharge of the water from the engine to the said gage, and means influenced by the actuation of the last said means for controlling said inlet.

5. In combination an engine, a water gage located at a point remote from the engine, a connection between the said engine and gage whereby water from the circulating system will be visibly discharged into the gage during the operation of the cooling system, an inlet for the cooling system, means for controlling the discharge of the water from the engine to the said gage, and fluid pressure means influenced by the actuation of the last said means for controlling said inlet.

6. In combination, an engine, a water gage located at a point remote from the engine, a connection between the said engine and gage whereby water from the circulating system will be visibly discharged into the gage during the operation of the cooling system, an inlet for the cooling system, means for controlling the discharge of the water from the engine to the said gage, means influenced by the actuation of the last said means for controlling said inlet, and an overflow from said system whereby water may be conducted therefrom under predetermined conditions in the actuation of the first said means.

7. In combination an engine having a water cooling circulation system, means for visually indicating the flow and temperature of the water in said system, means for controlling the circulation of the water, an inlet for said system, and means responsive in its operation to the operation of the second recited means for controlling said inlet.

8. In combination an engine having a water cooling circulation system, means for visually indicating the flow and temperature of the water in said system, means for controlling the circulation of the water, an inlet for said system, and fluid pressure controlled means responsive in its operation to the operation of the second recited means for controlling said inlet.

In testimony whereof, I have signed my name to this specification on this 12th day of November, 1929.

EMERY H. FAHRNEY.